United States Patent [19]
Ono et al.

[11] Patent Number: 6,041,154

[45] Date of Patent: Mar. 21, 2000

[54] IMAGE FIBER AND METHOD OF FABRICATING THE SAME

[75] Inventors: Katsuya Ono, Hino; Masaru Shiraiwa; Kimihiko Nishioka, both of Hachioji, all of Japan

[73] Assignee: Olympus Optical Co., Ltd., Tokyo, Japan

[21] Appl. No.: 09/014,165

[22] Filed: Jan. 27, 1998

Related U.S. Application Data

[63] Continuation of application No. 08/418,690, Apr. 7, 1995, abandoned.

[30] Foreign Application Priority Data

| Apr. 8, 1994 | [JP] | Japan | 6-070764 |
| Jul. 28, 1994 | [JP] | Japan | 6-176779 |
| Sep. 5, 1994 | [JP] | Japan | 6-095107 |
| Feb. 7, 1995 | [JP] | Japan | 7-019319 |

[51] Int. Cl.$^7$ .................................................. G02B 6/06
[52] U.S. Cl. ............................ 385/116; 385/115; 385/126
[58] Field of Search ................... 385/115–116, 119–121, 385/126; 600/177

[56] References Cited

U.S. PATENT DOCUMENTS

| 4,359,267 | 11/1982 | Appel | 385/116 |
| 4,462,662 | 7/1984 | Lama | 385/116 |
| 4,478,488 | 10/1984 | Bagley | 385/126 |
| 4,613,205 | 9/1986 | Seiji et al. | |
| 4,807,597 | 2/1989 | Tsuno et al. | 600/177 |
| 5,048,923 | 9/1991 | Tsumanuma et al. | 385/124 |
| 5,103,497 | 4/1992 | Hicks | 385/116 |
| 5,299,275 | 3/1994 | Jackson et al. | 385/116 |
| 5,327,514 | 7/1994 | Dujon et al. | 385/115 |
| 5,479,550 | 12/1995 | Nishioka et al. | 385/116 |

FOREIGN PATENT DOCUMENTS

| 67-696 | 12/1982 | European Pat. Off. | 385/116 |
| 141-037 | 5/1985 | European Pat. Off. | 385/116 |
| 427-232 | 5/1991 | European Pat. Off. | 385/116 |
| 59-28103 | 2/1984 | Japan . | |
| 60-52803 | 3/1985 | Japan . | |
| 60-257405 | 12/1985 | Japan | 385/116 |
| 4214042 | 8/1992 | Japan . | |

*Primary Examiner*—Hemang Sanghavi
*Attorney, Agent, or Firm*—Pillsbury Madison & Sutro LLP

[57] ABSTRACT

An image fiber includes plural kinds of cores and a common cladding containing the cores, which are arrayed so that no similar cores are adjacent one another. A method of making the image fiber is that a plurality of optical fiber elements having cores of different diameters are arranged so that no similar cores are adjacent one another, and after being inserted in a jacket pipe, are heated at a high temperature to fuse the cladding portions of the optical fiber elements so that the whole is drawn down to a desired thickness.

12 Claims, 11 Drawing Sheets

IMAGE FIBER AND METHOD OF FABRICATING THE SAME

This is a continuation of application Ser. No. 08/418,690, filed Apr. 7, 1995 now abandoned.

BACKGROUND OF THE INVENTION

1. Field of the Invention

This invention relates to an image fiber of small diameter for providing a high image quality, which is chiefly applied to endoscopes for medicine, and a method of fabricating the image fiber.

2. Description of Related Art

In general, for medical endoscopes using image fibers of this type, an arrangement, such as that shown in FIG. 1, has been well known from the past. In an endoscope apparatus 21, an object T illuminated by an illumination optical system, not shown, is imaged through an objective unit 22 at an entrance end 23a of an image fiber 23 constructed with the bundle of a plurality of optical fibers. An observation image T' thus formed is transmitted through the image fiber 23 and is observed through an eyepiece 34 at an exit end 23b.

Such image fibers are well known as flexible image fibers in which individual optical fibers constituting the image fiber are consolidated at their entrance and exit ends and are separated in their middle portions, and as conduit image fibers in which individual cores have a common cladding integrally constructed.

FIG. 2 shows a schematic sectional structure of the conduit image fiber. A conduit image fiber 25 has a plurality of cores 27 which are arrayed within a common cladding 26 in mutually spaced relation.

In the endoscope apparatus 21 using the image fiber of this type, its outside diameter has been more and more reduced in recent years. More recently, research and development have been made to design endoscopes 1 mm or less in diameter so that, for example, the interiors of blood vessels can be observed. In keeping with this, the image fiber 23 applied to the endoscope apparatus 21 has also become very thin.

However, individual optical fibers constituting the image fiber 23 of the endoscope apparatus 21 are each as small as several hundred micrometers in outside diameter and include cores each having a diameter of several micrometers to form two to three thousand pixels. Thus, satisfactory image quality is not necessarily brought to the observation image T'.

In the image fiber which will be described below, a core radius a, cladding thickness t, and core-to-core spacing P are defined by the notation shown in FIG. 3.

Of the above-mentioned image fibers, the flexible image fiber maintains its flexibility even if its diameter is increased. When the diameters of individual optical fibers are reduced, however, the image fiber is liable to break. Moreover, because the thickness of the cladding becomes smaller, light on the long-wavelength side leaks from the cladding and is colored blue, which is not desirable. Consequently, there is the disadvantage that the mutual spacing of the optical fibers cannot be reduced to about 10 $\mu$m or less.

The conduit image fiber, on the other hand, is often used in an endoscope of very small diameter. Although it is possible to reduce the mutual spacing of the optical fibers because the cores have a common cladding, if the outside diameter of the image fiber becomes greater than nearly 500 gm, its flexibility will be conspicuously lacking. As such, there is the problem that it is impossible to increase the diameter of the image fiber while maintaining the flexibility.

In the conduit image fiber 25 constructed as mentioned above, the common cladding 26 extends continuously along the optical axis, and hence the mutual spacing of the cores 27 can be made narrower than that of the flexible image fiber. However, it is known that part of light transmitted through the cores 27 leaks out through the interface between the cladding 26 and each of the cores 27 into the cladding 26, and the phenomenon that the component of the leaked light enters another core 27, namely what is called cross talk, is liable to produce. This cross talk phenomenon becomes particularly pronounced and forms a great cause for degrading the image quality when the thickness of the cladding 26 is no more than several times the wavelength of light, for example, the mutual spacing of the cores 27 is reduced to 10 $\mu$m or less.

In recent years, it is desired that even the image fiber 23 of very small diameter provides a high density of pixels and bright images, that is, is high In the core area ratio of the cores 27 (pixel density, namely the ratio of cores to an image fiber per unit sectional area).

For this purpose, it is required that the diameters of the cores 27 are reduced and the thicknesses of the cladding 26 between the cores 27 are made small to increase the core area ratio.

If, however, each thickness of the cladding 26 between the cores 27 is reduced to several times or less the wavelength of light, cross talk will be liable to occur because of the mode coupling between light through the optical fibers, thus causing the quality of transmitted image to degrade remarkably. In order to prevent the degradation of image quality, it is necessary to increase the thickness of the cladding 26. This, however, decreases the core area ratio of the cores 27. Consequently, the defect is encountered that a high density of pixels as well as bright images cannot be secured.

Thus, there is the discrepancy that in order to reduce cross talk, the thickness of the cladding 26 must be increased, while for improving the core area ratio, the cladding 26 must be made thinner.

In the image fiber of this type, it is generally known that its constituent optical fibers in which light propagated through the cores has different propagation constants $\beta$ are less in cross talk than those in which the light has the same propagation constant $\beta$. In order to vary the propagation constants $\beta$ of the light propagated through the cores, it is only necessary to vary the values of normalized frequencies V. It is seen that the value of the normalized frequency V is dependent on the core radius a as expressed by $$V = ka\sqrt{n_1^2 - n_2^2} \qquad (1)$$

where k=2$\pi$/$\lambda$ ($\lambda$ is the wavelength of light propagated through each optical fiber) and $n_1$ and $n_2$ are refractive indices of each core and the cladding, respectively.

A parameter generally referred to as the numerical aperture (NA) of a fiber is given by $$NA = \sqrt{n_1^2 - n_2^2} \qquad (2)$$

As one of provisions made for cross talk in the image fiber by devoting attention to the above respect, what is called a random image fiber, such as that disclosed in Japanese Patent Publication No. Hei 3-81126 or Hei 3-77962, has been known in which a plurality of optical fiber elements having cores of different diameters are bundled into an image fiber. The conventional random image fiber, however, has an unfavorable problem that since the optical fiber elements used are few in kind and are randomly bundled, cases not unfrequently occur in which fiber elements having cores of identical diameters are adjacent one another, and the image quality is degraded by cross talk produced between the fiber elements of identical core diameters.

In this image fiber, since its individual cores are also arranged in a random array, the resolving power of a transmitted image may be partially uneven and a straight edge may appear to curve. This makes the observation of the transmitted image difficult.

An image fiber whose individual cores are random in diameter and are arranged in a hexagonal close-packed array is disclosed, for example, in Japanese Patent Preliminary Publication No. Hei 4-214042. Even with this image fiber, optical fibers which are different in core-to-cladding ratio (the diametric ratio between a core and an optical fiber element) are randomly arranged, and hence there is the problem that, for example, when an object with even brightness is observed, unevenness in brightness is caused to the observation image itself.

SUMMARY OF THE INVENTION

It is, therefore, a primary object of the present invention to provide an image fiber which brings about a high resolving power and even brightness and is capable of reducing cross talk of transmitted light, and a method of fabricating the image fiber.

Another object of the present invention is to provide an image fiber which has a large diameter and is rich in flexibility, and a method of fabricating the image fiber.

The image fiber according to the present invention includes a plurality of optical fiber elements of different kinds, which are arranged so that a plurality of cores of identical kinds are prevented from being adjacent one another.

Further, the image fiber according to the present invention has a plurality of conduit image fiber units arranged in parallel, which are integrally formed at their entrance and exit ends and are separated in their middle portions.

The method of fabricating the image fiber according to the present invention is that a plurality of optical fiber elements of different kinds having cores of different diameters are arranged so that cores of identical outside diameters are prevented from being adjacent one another, and after being inserted in a jacket pipe, are heated at a high temperature to fuse the cladding portions of the optical fiber elements so that the whole is drawn down to a desired thickness.

Further, the method of fabricating the image fiber according to the present invention includes, at least, the steps of: forming individual conduit image fiber units in such a way that a plurality of optical fiber elements are arranged in a pipe composed of acid-soluble glass and are heated at a high temperature to fuse the cladding portions of the optical fiber elements; bundling the conduit image fiber units to elongate them to a desired thickness after heating at a high temperature; cutting the resultant conduit image fiber bundle into a desired length; and dissolving the acid-soluble glass lying in the middle portion of the cut conduit image fiber bundle.

These and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Before undertaking the description of the embodiments, it will be expedient to explain the fundamental structure and fabrication method of the image fiber according to the present invention.

Figure 1:
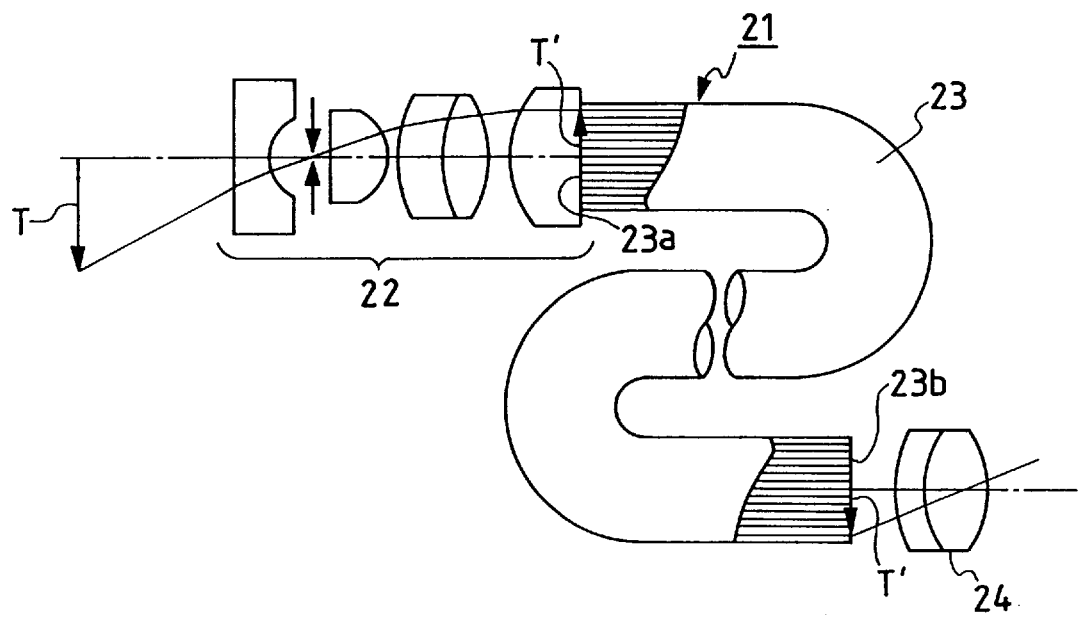
FIG. 1 is a view schematically showing the arrangement of a conventional endoscope for medicine.
Figure 2:
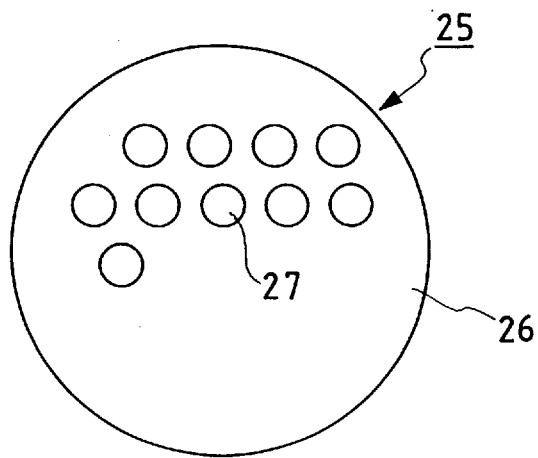
FIG. 2 is a cross sectional view schematically showing a conduit image fiber applied to the endoscope for medicine in FIG. 1.
Figure 3:
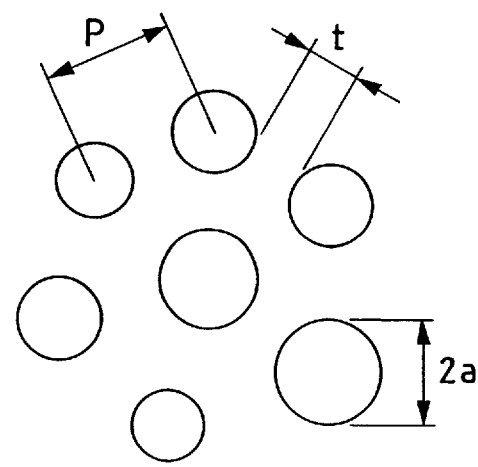
FIG. 3 is a view showing the notation for the core diameter, cladding thickness, and core-to-cladding space of an image fiber.
Figure 4:
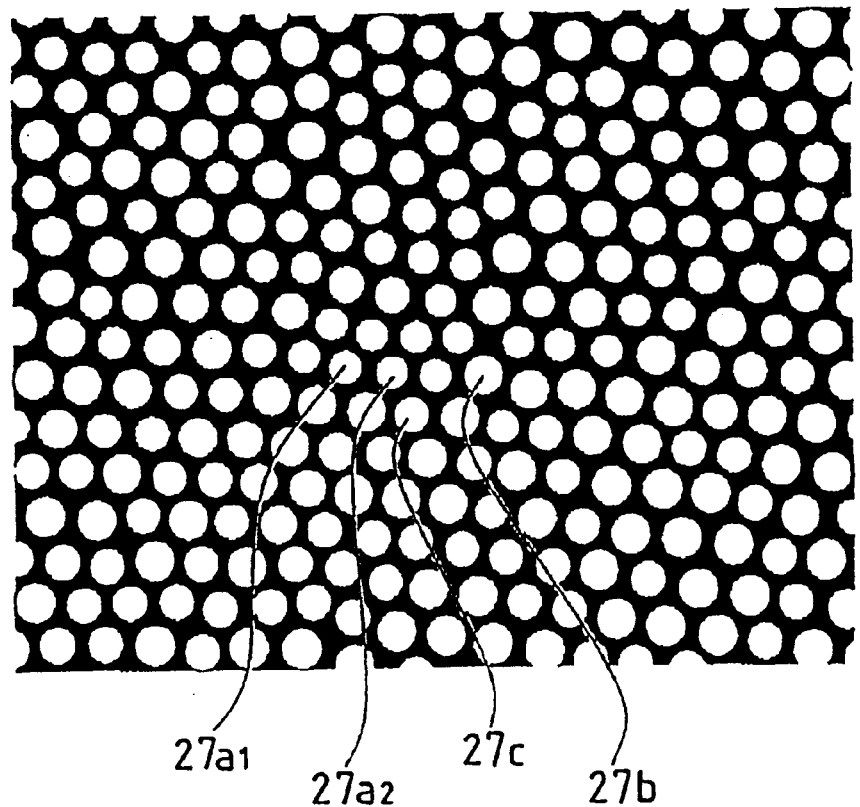
FIG. 4 is a view partially showing an example of the end face of a general random image fiber.

A random image fiber shown in FIG. 4 is such that a large number of optical fiber elements are bundled in which cores having three different kinds of diameters are each coated with the cladding, and this fiber bundle is heated, compressed, drawn down, and elongated to thereby have a desired outside diameter. The image fiber is thus formed, so that the cladding portions are fused into one, and it is here configured as a conduit image fiber.

Figure 5:
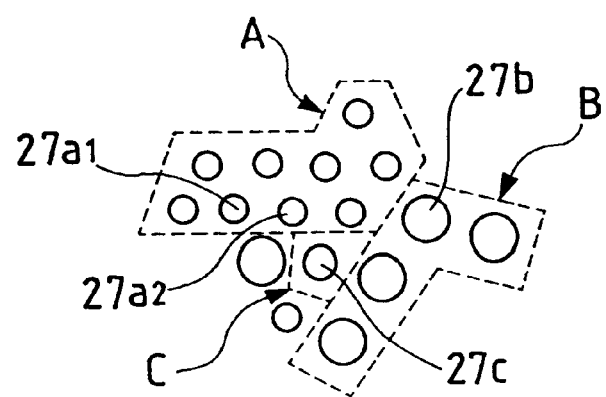
FIG. 5 is an explanatory view schematically showing the detail of essential parts in FIG. 4.

In this case, as shown in FIG. 5, first cores $27a_1$ and $27a_2$ having identical small diameters are arrayed adjacent one another within a region A. Further, second cores $27b$ having identical larger diameters are arrayed adjacent one another within a region B, and a third core $27c$ is disposed independently within a region C. These regions A, B, and C themselves are situated adjacent one another.

Figure 6:
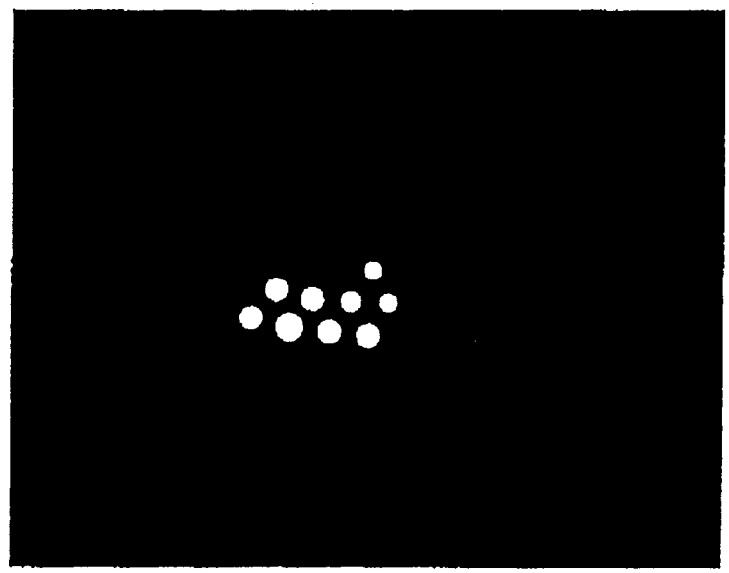
FIG. 6 is a view showing a light emergence state where light is incident on one of identical small cores adjacent one another within a region in FIG. 4.
Figure 7:
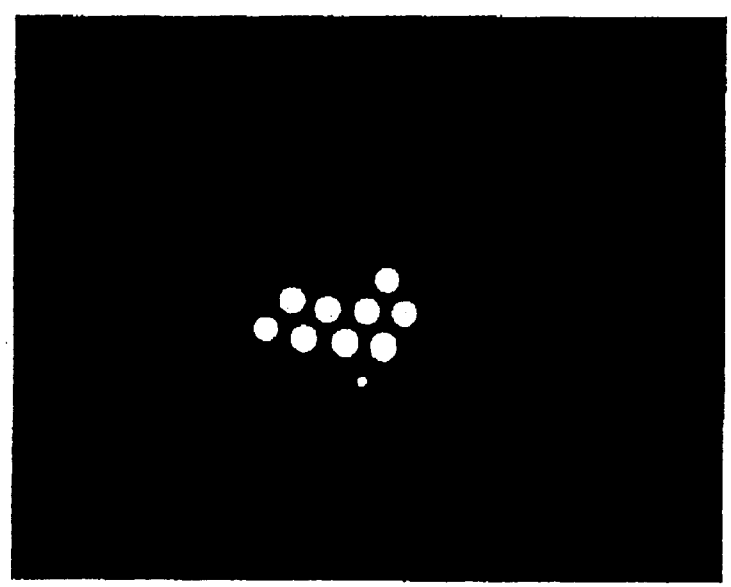
FIG. 7 is a view showing a light emergence state where light is incident on another of the identical small cores adjacent one another within the region in FIG. 4.

FIGS. 6 and 7 show light emergence states where light is incident on the first cores $27a_1$ and $27a_2$, respectively, adjacent within the region A in the image fiber shown in FIGS. 4 and 5. It is seen from these figures that light emerges from all cores contained in the region A, that is, from all cores with identical diameters, and therefore, cross talk causes light to leaks out to adjacent cores having identical diameters. In contrast to this, little light emerges from cores contained in the regions B and C. As a result, it is evident that cross talk is not entirely produced between fiber elements having cores of different diameters, or even if produced, it has a low level beyond recognition.

Figure 8:
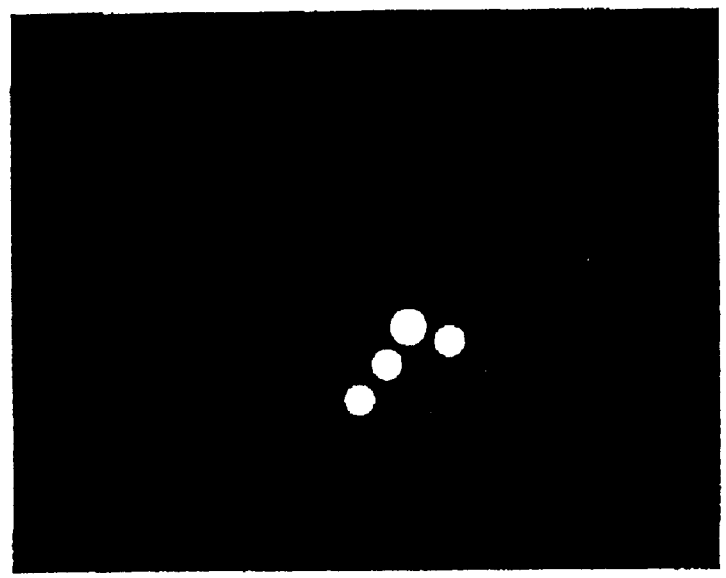
FIG. 8 is a view showing a light emergence state where light is incident on one of identical larger cores adjacent one another within another region in FIG. 4.

FIG. 8 shows a light emergence state where light is incident on the second core $27b$ within the region B. In this case also, exactly similar to the states of FIGS. 6 and 7, it is seen that light emerges only from adjacent cores of identical diameters and cross talk is considerably produced between them.

Figure 9:
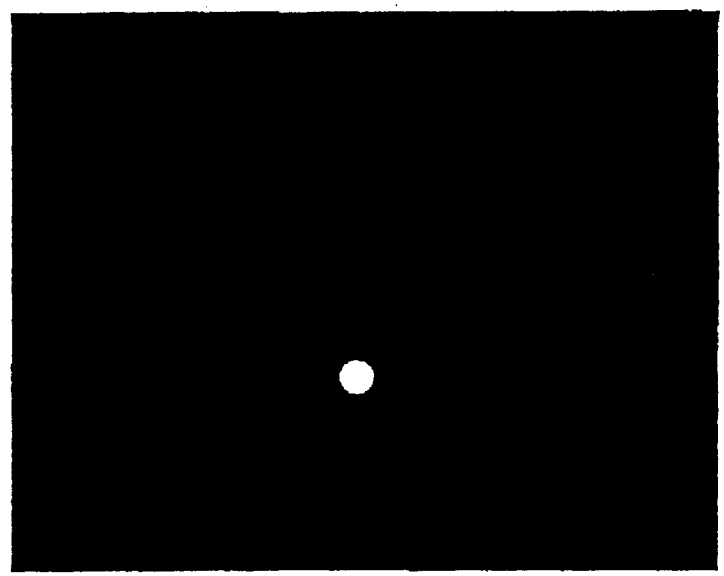
FIG. 9 is a view showing a light emergence state where light Is incident on a compromise core independent within still another region in FIG. 4.

If, on the other hand, the diameters and shapes of adjacent cores vary, the propagation constants δ of light propagated through the cores will also vary, and therefore the generation of cross talk is extremely limited. FIG. 9 shows a light emergence state where light is incident on one core adjacent to cores having different diameters, namely on the third core $27c$ within the region C. In this case, it is seen that light emerges only from the corresponding core, and in comparison with the cases of FIGS. 6, 7, and 8, cross talk is quite insignificant.

As obvious from the above description, cross talk produced between the cores of different diameters is minimized, and as shown in FIG. 9, when one core is surrounded by cores having different diameters, cross talk can be practically suppressed to such an extent that it cannot be recognized.

In order to obtain an image fiber constructed as mentioned above, as shown in FIG. 10, it is required that a plurality of optical fiber elements 31A, 31B, and 31C composed of at least three kinds (which in the figure are merely distinguished as A, B, and C) are used so that the optical fiber elements 31A, 31B, and 31C are regularly arranged in a hexagonal close-packed array. With common means having been used from the past, however, it is very difficult to realize such a hexagonal close-packed, orderly array in an image fiber having several thousand pixels.

Since in this case the optical fiber elements are used which have identical outside diameters and cores of different diameters, the optical fiber elements 31A, 31B, and 31C vary in core area ratio (the square of the core-to-cladding ratio). If the orderly array of the optical fiber elements is broken, there will be the fear that unevenness in brightness is inevitably caused as a whole in observing an object with even brightness. Thus, it is necessary to carefully consider the orderly array of the optical fiber elements, namely a hexagonal close-packed array.

Figures 10, 13:
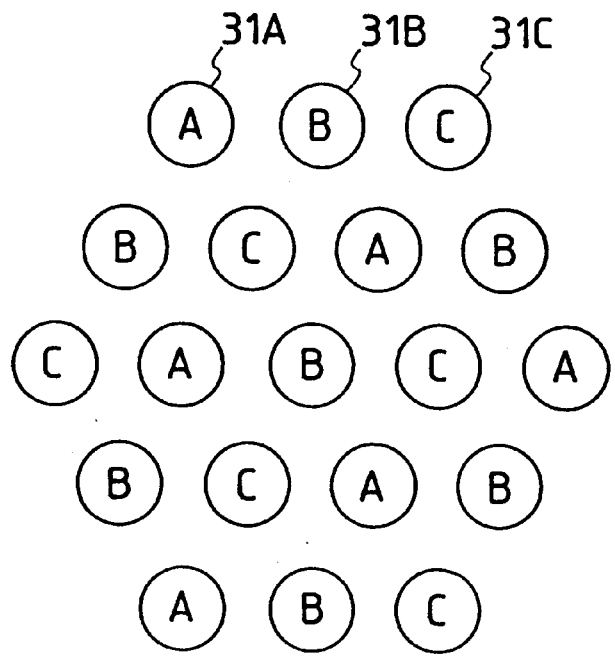
FIG. 10 is a cross sectional view schematically showing an example where three kinds of optical fiber elements are regularly arranged in a hexagonal close-packed array.
FIG. 13 is an explanatory view showing an example of the array of four kinds of optical fiber elements having identical core-to-cladding ratios and different outside diameters.
Figure 11:
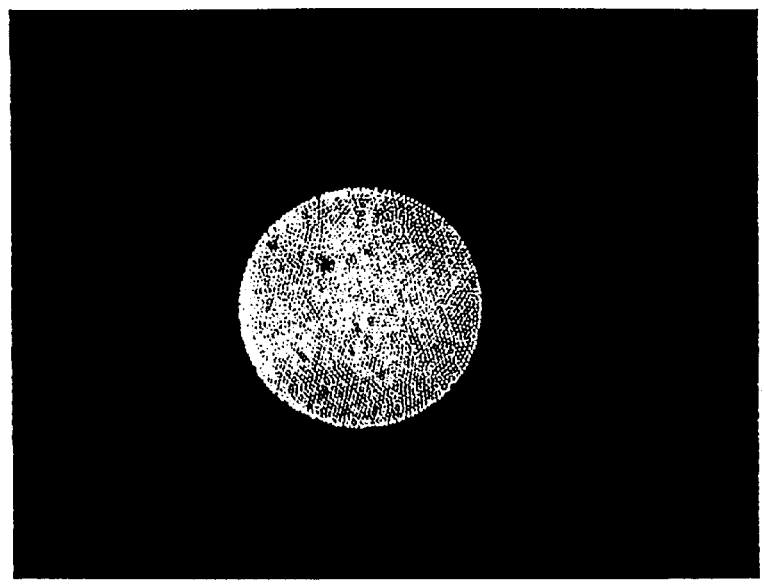
FIG. 11 is a view showing a light emergence state where light is uniformly incident on the entire end face of an image fiber comprising five kinds of optical fiber elements having different core-to-cladding ratios and identical outside diameters which are bundled in a hexagonal close-packed array.

FIG. 11 shows a light emergence state where uniform light is incident on the entire end face of an image fiber in which five kinds of optical fiber elements having different core-to-cladding ratios but identical outside diameters are irregularly bundled in a hexagonal close-packed array. As evident from this figure, unevenness in brightness is produced as a whole. In order to eliminate this unevenness, it is considered to, first, regularly arrange the optical fiber elements as shown in FIG. 10; second, use optical fiber elements having different sectional core shapes but identical core area ratios; and third, use a plurality of optical fiber elements having identical core area ratios but different outside diameters.

In order to secure the second image fiber in the foregoing, it is only necessary that a plurality of optical fiber elements, for example, having Identical outside diameters and cores of different shapes but equal sectional areas, are bundled, and then heated, compressed, and elongated. When such optical fiber elements are used, an image fiber can be formed in a hexagonal close-packed, orderly array of cores. As such, the resolving power of a transmitted image becomes uniform, unevenness in brightness caused when an object with even brightness is observed can be prevented. Also, when at least three kinds of optical fiber elements are used and regularly arranged so that fiber elements of similar diameters are prevented from being adjacent one another, an image fiber having the least cross talk can be obtained.

Figure 12:
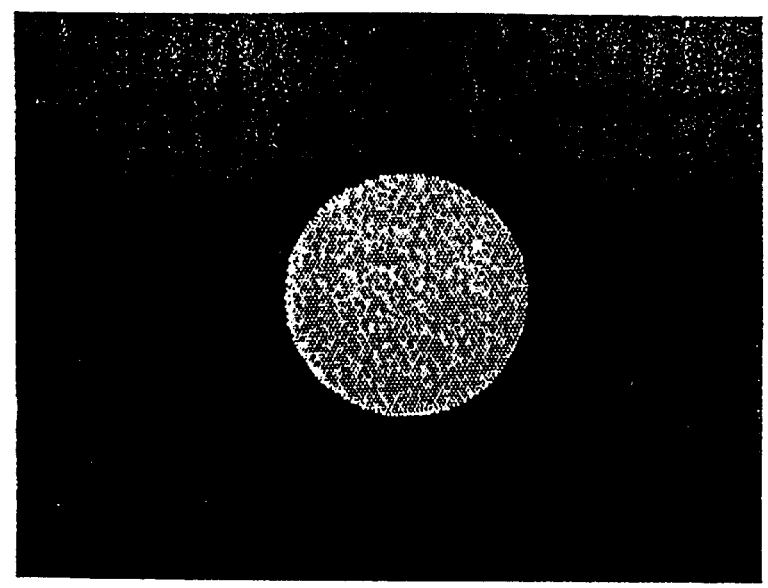
FIG. 12 is a view showing a light emergence state where light is uniformly incident on the entire end face of an image fiber comprising five kinds of optical fiber elements having identical core-to-cladding ratios and different outside diameters which are bundled In a close-packed array.

Next, the third image fiber will be explained. FIG. 12 shows a light emergence state where uniform light is incident on the entire end face of the image fiber in which five kinds of optical fiber elements having identical core-to-cladding ratios and different outside diameters are bundled in a close-packed array. As evident from this figure, moderate brightness is obtained as a whole. If, however, the third image fiber is fabricated by conventional methods, a disorderly array will be unavoidable, and hence it is necessary to consider the arrangement of the optical fiber elements so that fiber elements having similar outside diameters are not adjacent one another.

Here, reference is made to a first technique for arranging the optical fiber elements. A plurality of optical fiber elements having different outside diameters, after being mixed, is arranged almost horizontally. If, in this case, the mixed optical fiber elements are randomly arranged, and fiber elements having larger outside diameters are partially collected, relatively wide spaces will be provided between the fiber elements. If vibration is applied to the spaces, the fiber elements will be moved to change their positions and fiber elements having relatively smaller outside diameters will enter the spaces. As such, the fiber elements having larger diameters and smaller diameters are arranged in a nearly uniform density, and consequently, optical fiber elements having identical outside diameters are prevented from being adjacent one another.

The bundle of the optical fiber elements arranged by this technique, in which fiber elements having identical outside diameters are not partially collected, is inserted in a jacket pipe and is heated, compressed, and drawn down into an image fiber. In this way, a good image fiber with little cross talk can be secured.

In the optical fiber elements used in this technique, the difference in diameter between the closest optical fiber elements needs to be at least 2%. In view of the tolerance of structural accuracy, however, It is desirable that the difference is within the range of 5–10 By doing so, uniformity by vibration is easily secured, and unclearness of the image caused by the difference in diameter between the optical fiber elements can be suppressed to a minimum.

Figure 14:
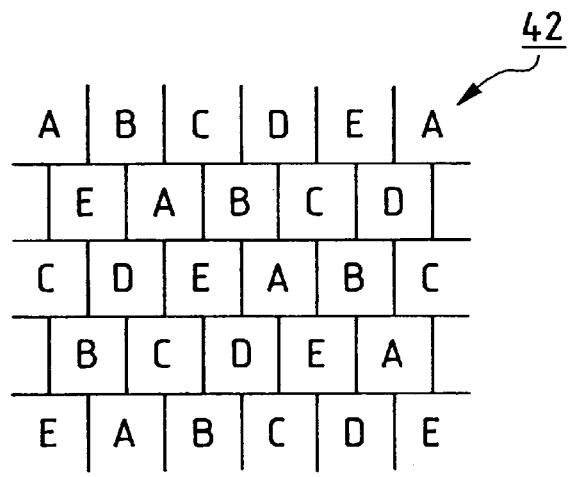
FIG. 14 is an explanatory view showing an example of the array of five kinds of optical fiber elements having identical core-to-cladding ratios and different outside diameters.

Next, a second technique for arranging the optical fiber elements will be described. In general, the image fiber of this type is fabricated in such a way that pluralities of optical fiber elements having different kinds of diameters, after being randomly inserted in the jacket pipe, are compressed at a high temperature and drawn down to a desired thickness. When the optical fiber elements are inserted in the jacket pipe, for example, as shown in FIG. 13 or 14, the use of auxiliary array means 41 or 42 with a net pattern frame or a grid pattern frame makes it possible to obtain the desired arrangement of the optical fiber elements.

Figure 15:
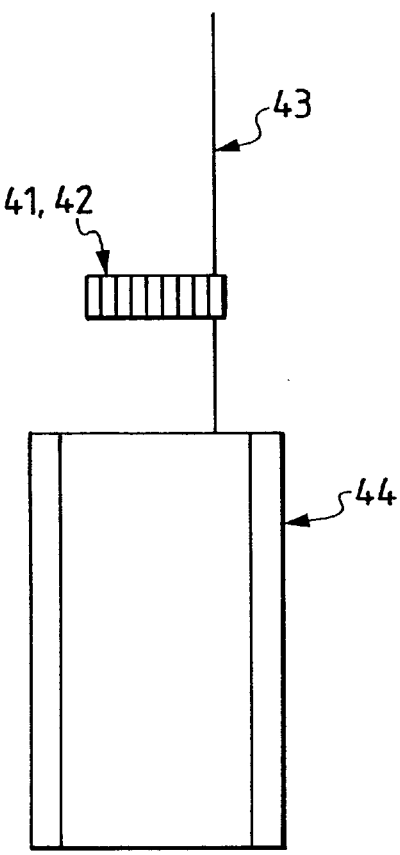
FIG. 15 is an explanatory view schematically showing a state where the optical fiber elements are inserted in a jacket pipe by using the arrays shown in FIGS. 13 and 14.

Alternatively, the arrangement may well be made by a computer-controlled mechanical device. Specifically, as shown in FIG. 15, for example, optical fiber elements 43 composed of four kinds designated by A, B, C, and D, or of five kinds designated by A, B, C, D, and E, are previously arranged corresponding to the divided frames of the auxiliary array means 41 or 42. When the optical fiber elements 43 thus arranged are inserted in a jacket pipe 44, fiber elements having identical outside diameters can be prevented from being adjacent one another, and even though the arrangement is somewhat disordered, its regularity is kept to such an extent that there is no problem in practical use. For the arrangement of the optical fiber elements, it is only necessary to arbitrarily determine the arrangement so that fiber elements of similar kinds are not adjacent in accordance with the number of kinds of fiber elements.

After the optical fiber elements 43 have been inserted in the jacket pipe 44, the optical fiber elements 43 and the jacket pipe 44 are heated at a high temperature to fuse the cladding portions of the optical fiber elements 43, and the whole is drawn down to the desired thickness. In this way, the desired image fiber can be secured.

In the first and second techniques for arranging the optical fiber elements, when optical fiber elements having different core diameters are used, cross talk can be reduced if the difference between the core diameters is 0.5% or more.

The striking development in recent years of the fabrication technology of optical fiber elements has offered the fabrication of optical fiber elements each having a diameter variation of about ±1 $\mu$m. In general, the optical fiber elements used in the image fiber of this type each have an outside diameter of nearly 300 $\mu$m and a core diameter of about 200 $\mu$m, and therefore can completely bring about the core diameter difference of 0.5% mentioned above. In view of size variations in the fabrication process, however, it is desirable that the difference between the core diameters is 1% or more, preferably 2% or more.

The optical fiber elements used in the first and second techniques require at least three kinds, but in order to minimize the probability that fiber elements having identical diameters are adjacent, it is desirable to use the optical fiber elements of five kinds or more.

Although It is ideal that thousands to tens of thousands of optical fiber elements are all arranged so that cores having identical diameters are prevented from being adjacent one another, this is actually difficult. However, unless at least 50% of all cores are adjacent to cores having identical diameters, the degradation of image quality caused by cross talk among the remaining cores will be slight, which offers no problem in observing the image. Also, unless at least 80% of all cores are adjacent to cores of identical diameters, there is no problem at all.

If the variations of core diameters and of distances between the cores in an image fiber increase, the image becomes hard to see. It is therefore required that the ratios of a minimum core diameter to a maximum core diameter and a minimum fiber element diameter to a maximum fiber element diameter each increase by 50% or less. For the image fiber of a small number of pixels (for example, up to 5000 pixels), it is particularly desirable that the ratio is held to an increase of 30% or less. This is because the image fiber of a small number of pixels originally provides a rough image compared with the image fiber of a larger number of pixels, and when the image is enlarged, the core diameters of the image fiber increase in size and become prominent.

For the optical fiber elements, on the other hand, when their fabrication cost is considered, it is favorable to have a constant core-to-cladding ratio (the ratio between the core diameter and the fiber element diameter) and different outside diameters. It is for this reason that the same raw material is used to change a drawing speed as desired, and thereby optical fiber elements having the desired outside diameters can be fabricated at will.

In the first and second techniques, it is desirable that the refractive index of the jacket pipe used in each is higher than that of the cladding. If the refractive index of the jacket pipe were lower, flare would be produced by incident light on the cladding. In order to prevent optical fiber elements having identical kinds from being adjacent, it is merely necessary to use at least three kinds of optical fiber elements.

Where use is made of optical fiber elements having identical outside diameters, different sectional core shapes, and equal core area ratios, the disorder of the arrangement is not caused by the differences in diameter between the optical fiber elements. However, in the case of the use of optical fiber elements having different outside diameters as mentioned above, the arrangement is disordered (not in a hexagonal close-packed array), and thus the possibility that optical fiber elements of identical kinds are adjacent one another increases, with resultant cross talk.

Provision to obviate this drawback is that the ratio between the minimum outside diameter and the maximum outside diameter of the optical fiber elements is made to increase by 10% or less, preferably 5% or less. By limiting the difference between the outside diameters of the fiber elements in this way, the disorder of the arrangement of the optical fiber elements can be kept to a minimum to prevent the generation of cross talk.

For alternative provision, it is effective to increase the kinds of optical fiber elements used. However, because of accuracy and tolerance in the fabrication process, the difference between the outside diameters of the optical fiber elements needs to be at least 2%, preferably 5–10%. As mentioned above, in order that the difference between the minimum and maximum diameters increases by 50% or less to prevent the image from being hard to see, the optical fiber elements used require 10 kinds or less. For the image fiber of a small number of pixels (for example, up to 5000 pixels), because as mentioned above the ratio between the minimum and maximum diameters is desirable to increase by 30% or less, it is preferable that the optical fiber elements used are of 4–6 kinds.

Furthermore, it is desirable that the core-to-cladding ratio of the optical fiber elements used satisfies a condition:

$$0.7 > \text{core-to-cladding ratio} > 0.4 \qquad (3)$$

If the value of the core-to-cladding ratio exceeds the upper limit of Eq. (3), the thickness of the cladding will be smaller and cross talk will be liable to occur. If, by contrast, the value of the ratio is below the lower limit of Eq. (3), the core area ratio will decrease and brightness will be lacking.

Where the optical fiber elements used are few in kind and the ratio between the minimum and maximum outside diameters of the optical fiber elements exceeds 10%, the arrangement of the optical fiber elements encased in the jacket pipe will be dislocated because of the difference between the outside diameters. According to the techniques for the arrangements described above, the dislocation is such that spaces caused by the difference of the outside diameter are merely filled, and thus few cases are known where plural fiber elements of identical kinds (or outside diameters) are adjacent one another or, as shown in FIG. 5, are collected in one place. Moreover, where plural kinds of optical fiber elements having identical outside diameters are used, no cases arise in which unevenness in brightness is produced as shown in FIG. 11.

Although the sectional inside shape of the jacket pipe is generally circular, a hexagonal form is used when needed, and thereby the dislocation of the arrangement of the optical fiber elements in the periphery can be kept to a minimum.

Next, reference is made to the transmission efficiency of light transmitted by the image fiber. As previously described, in order to reduce the diameter of the image fiber and maintain a high resolving power, there is the need to reduce the fiber spacings and the core diameters as well. If the core diameters are reduced, propagation modes generally decreases to single modes at a V value of 2.405 or less.

Figure 16:
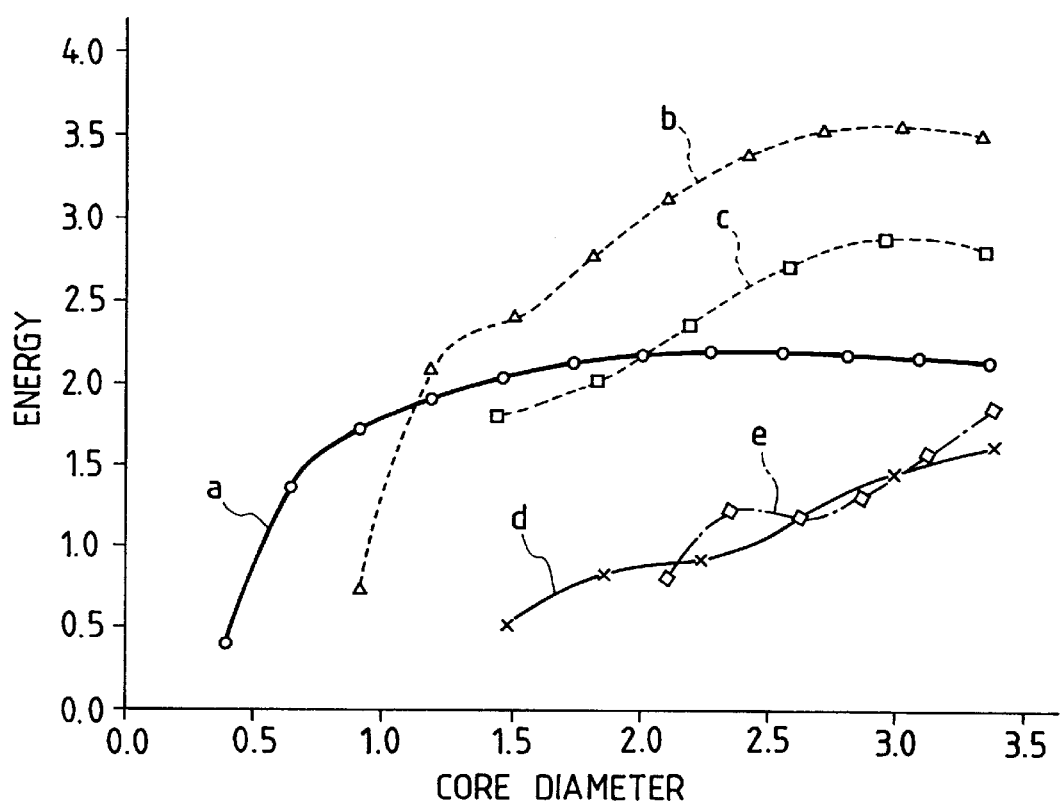
FIG. 16 is a diagram showing the rate of energy of propagation modes exited in the cores of optical fibers.

FIG. 16 is a graph showing the rates of energies of propagation modes (wavelength 600 nm) exited when light is incident through an objective optical system with an F-number of 1.4 on the optical fiber elements with an numerical aperture (NA) of 0.495. In this figure, the abscissas are core diameters and the ordinates are the rates of energies on an arbitrary scale. As is obvious from FIG. 16, it is seen that in a multimode, the rate of propagation energy is high, not only for an $LP_{01}$ mode a but also for an $LP_{11}$ mode b and an $LP_{21}$ mode c. For the propagation of the $LP_{11}$ mode b, a core diameter of 1 μm or more is required, while for the $LP_{21}$ mode c, a core diameter of 1.5 μm or more is required. Below these values, as in modes d and e, it is expected that the propagation mode is lessened and brightness is remarkably deteriorated. Almost the same may be said of the case where the F-number of an incident beam of light is changed.

In order to ensure desired brightness, the $LP_{11}$ mode b is desirable to propagate in a visible region (400–650 nm), and thus it is necessary to satisfy a relation:

$$V > 2.405 \qquad (4)$$

In addition, to much improving the transmission efficiency, it is preferable that the $LP_{21}$ mode c can also propagate. In this case, the condition of propagation of the $LP_{21}$ mode c needs to satisfy a relation:

$$V > 3.83 \qquad (5)$$

For the random image fiber, which comprises a plurality of optical fiber elements bundled in which the V values of light propagated through the cores vary, the fiber element of moderate thickness needs to satisfy Eqs. (4) and (5) in practical use. Moreover, it is most ideal that all kinds of optical fiber elements used satisfy Eqs. (4) and (5). For example, most of image fibers used in endoscopes for blood vessels which are put to practical use each have an outside diameter of about 0.3 mm and nearly 3000 cores (nearly 3000 pixels), each having a diameter of 2–3 μm, with a spacing of nearly 4 μm. Therefore, to satisfy Eq. (5) in this specification, the NA of the image fiber needs to follow a condition:

$$\sqrt{n_1^2 - n_2^2} \geq 0.4 \qquad (6)$$

Since, however, an image with nearly 3000 pixels is relatively poor in quality, an image fiber having about 10000 pixels is usually required. To realize the 10000 pixels, the above-mentioned image fiber having an outside diameter of 0.3 mm requires a core diameter of about 1 μm and a core-to-core spacing of about 2 μm. In order to satisfy Eq.(5), an image fiber of extremely high NA is required. In practice, however, an image fiber as high as 0.7 or more in NA has the problems of decreasing the transmittance and coloring light. If, therefore, brightness is somewhat lowered, a condition required for satisfying Eq. (4) is given by $$\sqrt{n_1^2 - n_2^2} \geq 0.498 \qquad (7)$$

Thus, the optical fiber elements require an NA of 0.4 or more for cores 2–3 μm or less in diameter, and an NA of 0.498 or more for cores 1 μm or less in diameter. For the cladding thickness, there is the defect that cross talk increases as the cladding becomes thin, while excessive cladding thickness causes shortage of brightness because the core area ratio is decreased.

In order to make these relations compatible with each other, it is desirable that the cladding thickness t is defined as $$1.8 \text{ }\mu m > t > 0.8 \text{ }\mu m \tag{8}$$

For defining the NA as Eq. (6) or (7), on the other hand, a choice between glass materials applied to the optical fiber elements is that a multicomponent base is preferable to a quartz base. In the case of the multicomponent-base glass material, however, it is difficult that the cladding has a refractive index of nearly 1.5 or less, and thus the core refractive index $n_1$ needs to be defined as $$n_1 > 1.56 \tag{9}$$

If the core refractive index ni exceeds 1.7, optical fiber elements 0.5–5 m long may cause light propagated through the optical fiber elements to be colored yellow, depending on the properties of materials used (in general, high-index glass is low in transmittance on the short-wavelength side). It is thus desirable that the core refractive index $n_1$ satisfies a condition:

$$1.7 > n_1 \tag{10}$$

If, on the other hand, the cladding refractive index $n_2$ satisfies a condition:

$$1.53 > n_2 > 1.48 \tag{11}$$

it is possible to form the cladding of the multicomponent-base glass material and also satisfy the condition of Eq. (5).

These relations are also applied to the embodiments of the present invention which will be described later.

Where the optical fiber elements having different core diameters are bundled, the cutoff frequencies of the propagation modes vary because the V values of light propagated through the cores of individual optical fiber elements are different from one another. As such, the transmission efficiency of optical fiber elements having small core diameters will be decreased. This is disadvantageous to brightness and may cause unevenness in brightness. In such a case, as will be described later, the rates of the number of optical fiber elements having small core diameters and that of optical fiber elements having larger core diameters are reduced to increase the rate of the number of optical fiber elements having moderate core diameters. In this way, a decrease of the transmission efficiency, due to the cutoff phenomenon, and unevenness in brightness can be prevented with great ease.

As previously mentioned, it is known that the conduit image fiber is conspicuously lacking in flexibility by increasing the outside diameter. In the present invention, a plurality of conduit image fiber units each having an outside diameter of 500 $\mu$m or less is bundled to maintain its flexibility. In other words, with the conduit image fiber, if the outside diameter is 500 $\mu$m or less, complete flexibility can be kept. If the outside diameter is too small, the conduit image fiber will be liable to break and the rate occupied by a glass layer (jacket layer) devoid of the core portion will increase. As such, it is actually desirable that the outside diameter is nearly 30 $\mu$m.

Subsequently, a description will be given of the method of fabricating the image fiber thus constructed. At a first fabrication step, a plurality of optical fiber elements are arranged in a pipe consisting of acid-soluble glass, and are heated and compressed to provide the preforms of the conduit image fiber units. At a second step, the preforms of the conduit image fiber units thus available are bundled, and are heated, compressed again, and drawn down to a desired thickness to obtain an image fiber bundle. Next, at a third step, the image fiber bundle is cut to a predetermined length, and at a fourth step, the acid-soluble glass in the middle portion of the image fiber bundle is dissolved. In this way, the image fiber of high resolving power can be secured which has a desired relatively large outside diameter and maintains its flexibility.

In each of the conduit image fiber units, the acid-soluble glass pipe on the outside, which does not contribute to the image transmission, forms a portion devoid of pixels. Hence, the smaller the thickness of the pipe, the better. However, pipes of small thickness are generally poor in productivity, and it is desirable that a pipe of relatively large thickness is first used, and after the first fabrication step, the thickness is reduced to about 100–500 $\mu$m.

Referring to the drawings and tables, the embodiments of the image fiber according to the present invention and its fabrication method will be explained in detail below.

Figure 17:
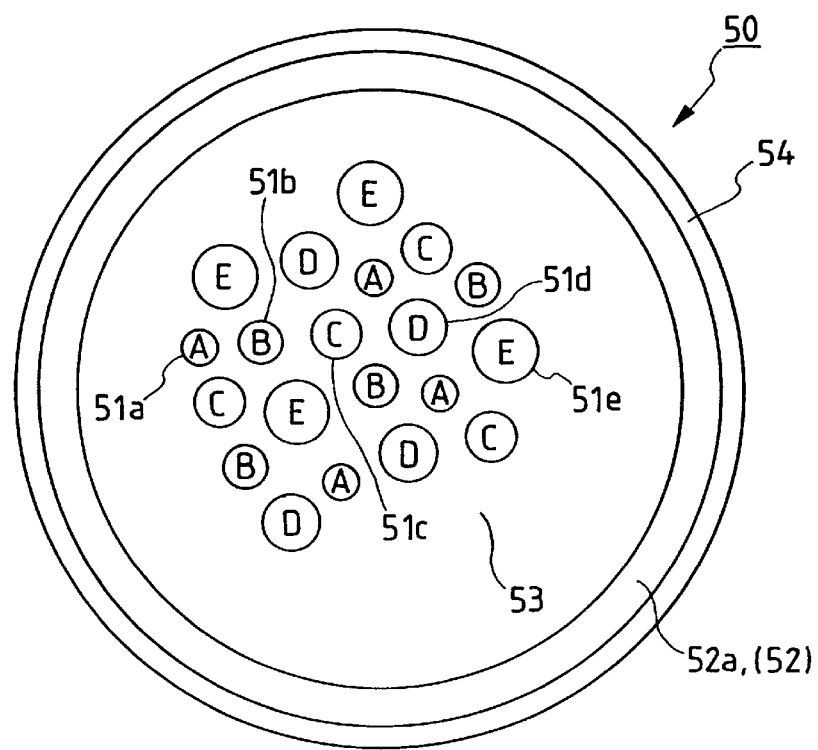
FIG. 17 is a cross sectional view schematically showing the structure of the image fiber relative to first to eighth embodiments according to the present invention.

FIG. 17 shows a schematic structure relative to the first to eighth embodiments of the present invention. In any of the first to third embodiments, numerous optical fiber elements are used which are about equal in core-to-cladding ratio and include five kinds of cores 51a, 5b, 51c, 51d, and 51e having different diameters. The optical fiber elements are arranged in the desired array mentioned above, and after being inserted in a common jacket pipe 52, are heated at a high temperature. Whereby the cladding portions of the optical fiber elements are fused, and the whole is drawn down to a predetermined thickness to form an image fiber 50 having a desired outside diameter.

In the image fiber 50 fabricated in this way, the cladding portions of the optical fiber elements are fused and integrated, and five kinds of cores 51a, 51b, 51c, 51d, and 51e having different thicknesses are mixed in an orderly array within an integrated cladding 53. Although in this case the cores 51a, 51b, 51c, 51d, and 51e are not necessarily arranged in a completely orderly array, there are few cases where cores having identical diameters are adjacent one another. The jacket pipe 52, after being drawn down, remains as a jacket layer 52a surrounding the periphery of the integrated cladding 53, and its peripheral surface is covered with a coating layer 54 for protection.

First embodiment

Table 1 shows the data of this embodiment (the core-to-cladding ratio indicates the ratio of the core diameter to the cladding diameter of each of the optical fiber elements).

TABLE 1

| Core-to-cladding ratio = 0.64 | | | | |
|---|---|---|---|---|
| Outside diameter of cladding | Core diameter (element) | Core diameter (after spinning) | Core-to-core spacing | V value |
| 400 | 255 | 2.83 | Average 3.8 | 6.77 |
| 380 | 243 | 2.69 | | 6.43 |
| 360 | 230 | 2.55 | | 6.10 |
| 340 | 217 | 2.41 | | 5.76 |
| 320 | 204 | 2.26 | | 5.40 |

Unit: $\mu$m, (NA = 0.495, $\lambda$ = 650 nm)

The image fiber according to the data of the first embodiment is fabricated in such a way that five kinds of optical fiber elements, 600 for each kind, having different core and cladding diameters are distributed by the second technique mentioned above, and after being heated and compressed, are drawn down.

Although, therefore, individual core diameters (after spinning) of the image fiber thus available are of five different kinds, individual core-to-core spacings of each kind are 3.8 $\mu$m on the average. Consequently, it becomes possible to eliminate unevenness in brightness. Where predetermined light (NA=0.495 and λ=650 nm) is incident on this image fiber, cross talk can be reduced because the V values of the light are of five different kinds and few cores of identical kinds are adjacent.

Thus, the image fiber according to the data of the first embodiment is capable of suppressing cross talk to prevent the degradation of image quality, and has a small diameter and a high resolving power without unevenness in brightness.

Second embodiment

Table 2 shows the data of this embodiment.

TABLE 2

Core-to-cladding ratio = 0.48

| Outside diameter of cladding | Core diameter (element) | Core diameter (after spinning) | Core-to-core spacing | V value |
|---|---|---|---|---|
| 407 | 193 | 1.13 | Average 2 | 3.09 |
| 385 | 183 | 1.07 | | 2.90 |
| 360 | 171 | 1 | | 2.71 |
| 335 | 159 | 0.93 | | 2.52 |
| 313 | 149 | 0.87 | | 2.35 |

Unit: μm, (NA = 0.56, λ = 650 nm)

In the image fiber according to the data of the second embodiment, because fiber elements having the smallest core diameters (after spinning) assume the single modes (λ=650 nm), the largest cores (diameter=1.13 μm) and the smallest cores (diameter=0.87 μm) are respectively taken as 15% of the total number of cores, the second largest cores (diameter=1.07 μm) and the second smallest cores (diameter=0.93 μm) are respectively taken as 25%, and the remaining compromise cores (diameter=1 μm) are taken as 20%. The optical fiber elements are distributed by the first technique, and after being heated and compressed, are drawn down into the image fiber. Here, If only one fiber content is increased, the meaning of mixing different fiber elements will be shaded. It is therefore favorable that the difference of the fiber content is randomly determined within the range of about 10%.

Even the image fiber according to the data of the second embodiment thus obtained, almost similar to the case of the fist embodiment, is capable of suppressing cross talk to prevent the degradation of image quality, and has a small diameter and a high resolving power without unevenness in brightness.

Third embodiment

Table 3 shows the data of this embodiment.

TABLE 3

Core-to-cladding ratio = 0.57

| Outside diameter of cladding | Core diameter (element) | Core diameter (after spinning) | Core-to-core spacing | V value |
|---|---|---|---|---|
| 391 | 233 | 1.7 | Average 2.5 | 4.11 |
| 386 | 220 | 1.6 | | 3.87 |
| 360 | 206 | 1.5 | | 3.62 |
| 337 | 192 | 1.4 | | 3.38 |
| 314 | 179 | 1.3 | | 3.14 |

Unit: μm, (NA = 0.5, λ = 650 nm)

In the image fiber according to the data of the third embodiment, all cores (after spinning) are constructed so that the transmission of the $LP_{11}$ mode is possible, and five kinds of optical fiber elements are mixed at the same rate (600 for each kind) by the first technique to thereby achieve substantially the same effect as in the first and second embodiments.

Fourth embodiment

Table 4 shows the data of this embodiment.

TABLE 4

Core-to-cladding ratio = 0.64

| Outside diameter of cladding | Core diameter (element) | Core diameter (after spinning) | Core-to-core spacing | V value |
|---|---|---|---|---|
| 405 | 259 | 2.87 | Average 3.8 | 6.87 |
| 390 | 249 | 2.76 | | 6.60 |
| 375 | 240 | 2.66 | | 6.37 |
| 360 | 230 | 2.55 | | 6.10 |
| 345 | 220 | 2.44 | | 5.83 |
| 330 | 211 | 2.34 | | 5.60 |
| 315 | 201 | 2.23 | | 5.33 |

Unit: μm, (NA = 0.495, λ = 650 nm)

The image fiber according to the data of the fourth embodiment is fabricated in such a way that seven kinds of optical fiber elements, about 430 for each kind, having nearly equal core-to-cladding ratios and different core diameters are distributed by the first technique, and after being heated and compressed, are drawn down. Although the structure of the image fiber of the fourth embodiment is not shown in particular, its feature is the same as in the preceding embodiments.

The image fiber according to the data of the fourth embodiment can also secure the same effect as in the preceding embodiments.

Fifth embodiment

Table 5 shows the data of this embodiment.

TABLE 5

Core-to-cladding ratio = 0.64

| Outside diameter of cladding | Core diameter (element) | Core diameter (after spinning) | Core-to-core spacing | V value |
|---|---|---|---|---|
| 375 | 240 | 2.66 | Average 3.8 | 6.37 |
| 360 | 230 | 2.55 | | 6.10 |
| 345 | 220 | 2.44 | | 5.83 |

Unit: μm, (NA = 0.495, λ = 650 nm)

Figure 18:
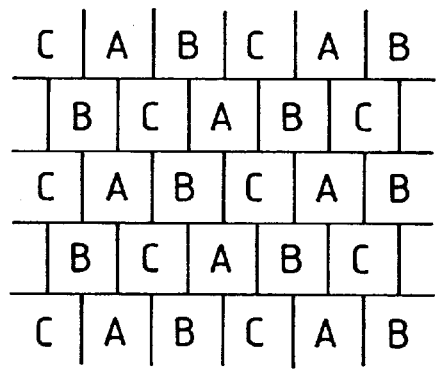
FIG. 18 is an explanatory view showing an example of the arrangement of three kinds of optical fiber elements having different core-to-cladding ratios and identical outside diameters.

The image fiber according to the data of the fifth embodiment is fabricated in such a way that three kinds of optical fiber elements, about 1000 for each kind, having nearly equal core-to-cladding ratios and different core diameters are regularly arranged through the array means, such as that shown in FIG. 18, by the second technique, and after being heated and compressed, are drawn down. Although the structure of the image fiber of the fifth embodiment is not shown in particular, its feature is the same as in the preceding embodiments.

The image fiber according to the data of the fifth embodiment can also bring about the same effect as in the preceding embodiments.

Sixth embodiment

Table 6 shows the data of th is embodiment.

TABLE 6

| Outside diameter of cladding | Core diameter (element) | Core diameter (after spinning) | Core-to-core spacing | V value |
|---|---|---|---|---|
| 360 | 245 | 2.72 | 3.8 | 6.5 |
| 360 | 230 | 2.55 | | 6.10 |
| 360 | 215 | 2.38 | | 5.70 |

Unit: μm, (NA = 0.495, λ = 650 nm)

The image fiber according to the data of the sixth embodiment is fabricated in such a way that three kinds of optical fiber elements, about 1000 for each kind, are regularly arranged through the array means, such as that shown in FIG. 18, by the second technique, and after being heated and compressed, are drawn down. The image fiber is formed by the use of optical fiber elements having different core-to-cladding ratios, but the fiber elements are regularly arranged, so that a good image fiber can be obtained which is uniform in brightness and has little cross talk. Although the structure of the image fiber of the sixth embodiment is not shown in particular, its feature is the same as in the preceding embodiments.

The image fiber according to the data of the sixth embodiment can also bring about the same effect as In the preceding embodiments.

Seventh embodiment

Table 7 shows the data of this embodiment.

TABLE 7

| | Core-to-cladding ratio = 0.7 | | | |
|---|---|---|---|---|
| Outside diameter of cladding | Core diameter (element) | Core diameter (after spinning) | Core-to-core spacing | V value |
| 405 | 284 | 3.14 | Average 3.8 | 7.51 |
| 390 | 273 | 3.02 | | 7.23 |
| 375 | 263 | 2.91 | | 6.96 |
| 360 | 252 | 2.79 | | 6.67 |
| 345 | 242 | 2.67 | | 6.39 |
| 330 | 231 | 2.56 | | 6.12 |
| 315 | 221 | 2.44 | | 5.84 |

Unit: μm, (NA = 0.495, λ = 650 nm)

The image fiber according to the data of the seventh embodiment is fabricated in such a way that seven kinds of optical fiber elements, about 430 for each kind, having nearly equal core-to-cladding ratios and different core diameters are distributed by the first technique, and after being heated and compressed, are drawn down. Although the structure of the image fiber of the seventh embodiment is not shown in particular, its feature Is the same as in the preceding embodiments. The image fiber according to the data of the seventh embodiment can also secure the same effect as in the preceding embodiments.

Eighth embodiment

Table 8 shows the data of this embodiment.

TABLE 8

| | Core-to-cladding ratio = 0.64 | | | |
|---|---|---|---|---|
| Outside diameter of cladding | Core diameter (element) | Core diameter (after spinning) | Core-to-core spacing | V value |
| 405 | 259 | 1.57 | Average 2.08 | 3.76 |
| 390 | 249 | 1.51 | | 3.61 |
| 375 | 240 | 1.46 | | 3.49 |
| 360 | 230 | 1.40 | | 3.35 |
| 345 | 220 | 1.34 | | 3.21 |
| 330 | 211 | 1.28 | | 3.06 |
| 315 | 201 | 1.22 | | 2.92 |

Unit: μm, (NA = 0.495, λ = 650 nm)

The image fiber according to the data of the eighth embodiment is fabricated in such a way that seven kinds of optical fiber elements, about 1430 for each kind, having nearly equal core-to-cladding ratios and different core diameters are distributed by the first technique, and after being heated and compressed, are drawn down. Although the structure of the image fiber of the eighth embodiment is not shown in particular, its feature is the same as in the preceding embodiments. The image fiber according to the data of the eighth embodiment can also secured the same effect as in the preceding embodiments.

The image fiber disclosed in each of the first to eighth embodiments uses the cladding having a refractive index of 1.5177 and the jacket pipe having a refractive index of 1.53, the periphery of which is coated with a resin mixed with carbon.

Ninth embodiment

Figure 19:
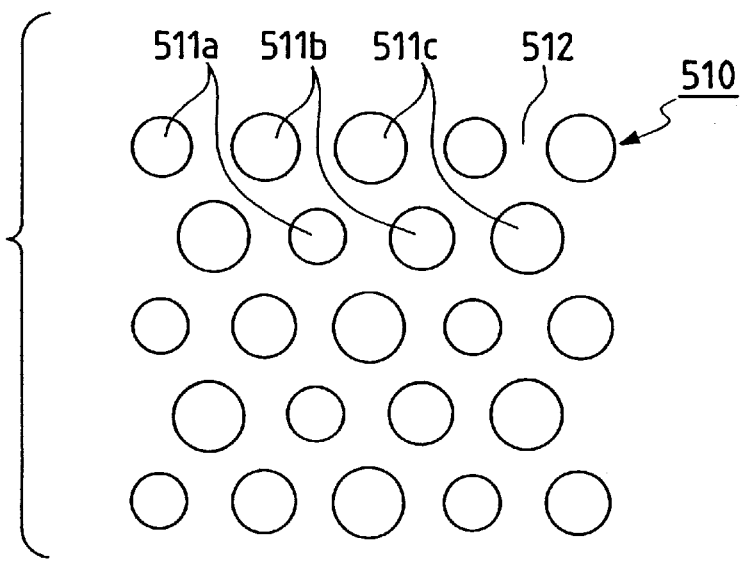
FIG. 19 is a partially sectional view showing the array of cores of a conduit image fiber in a ninth embodiments of the present invention.

This embodiment, as shown in FIG. 19, refers to a conduit image fiber 510 having an outside diameter of nearly 300 μm, a length of nearly 3 m, and about 3000 pixels which includes three kinds of cores regularly arranged in a hexagonal close-packed array so that no cores of identical diameters are adjacent one another. In this case, the diameters of three kinds of cores 511a, 511b, and 511c are 2.5, 2.55, and 2.6 μm, respectively. The core-to-core spacing is 3.8 μm, each difference between a small core diameter and a larger core diameter closest thereto is about 2%, and the difference between the smallest core diameter and the largest core diameter is 4%. The cores 511a, 511b, and 511c each have a refractive index of 1.59, and a common cladding 512 of the cores 511a, 511b, and 511c has a refractive index of 1.5177.

In the conduit image fiber 510 of the ninth embodiment constructed as in the foregoing, the diameters of the cores 511a, 511b, and 511c adjacent one another vary, and hence the propagation constants of the cores 511a, 511b, and 511c also vary, which makes the production of cross talk difficult. The result is that the core-to-core spacings, namely the outside diameter of the image fiber 510 itself can be reduced.

Although the sectional areas of the cores 511a, 511b, and 511c vary, any difference between them is slight. Furthermore, the cores 511a, 511b, and 511c are regularly arranged in a hexagonal array so that no similar cores are adjacent one another, and if the sum of areas of three pixels adjacent one another is taken as one unit area, the ratio of the unit area to the sectional core area becomes uniform over the entire region of the transmitted image. Thus, there is not any fear of bringing unevenness to brightness in observing the object of even brightness.

Tenth embodiment

Figure 20:
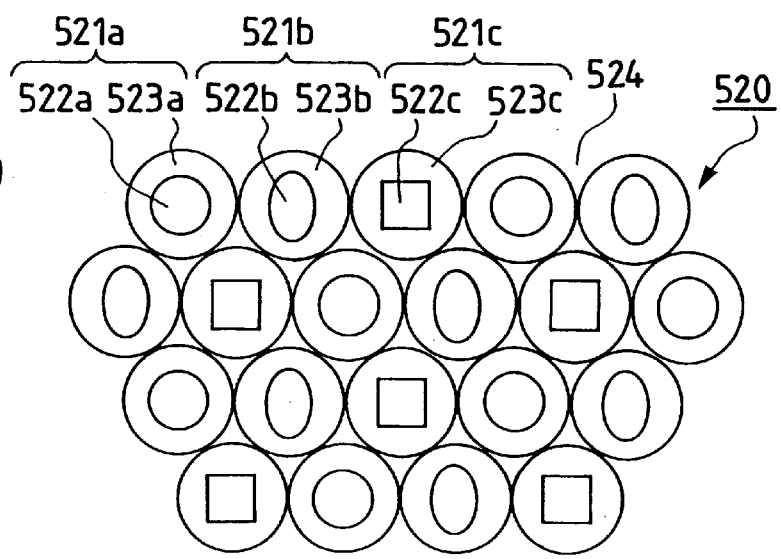
FIG. 20 is a partially sectional view showing the arrangement of optical fiber elements encased in a glass pipe for explaining the method of fabricating a conduit image fiber in a tenth embodiments.

This embodiment uses optical fiber elements of identical outside diameters which contain three kinds of cores having different sectional shapes and equal sectional areas. Specifically, the tenth embodiment, as shown in FIG. 20, employs pluralities of optical fiber elements 521a each having a core 522a of circular cross section encased in a cladding 523a, optical fiber elements 521b each having a core 522b of elliptic cross section encased in a cladding 523b, and optical fiber elements 521c each having a core 522c of square cross section encased in a cladding 523c. The optical fiber elements 521a, 521b, and 521c are regularly arranged in a hexagonal close-packed array so that fiber elements having cores of identical sectional shapes are prevented from being adjacent one another, and after being heated and compressed, are drawn down Into a conduit image fiber 520. In this image fiber, the core-to-core spacing is 3 μm, the core area ratio in the image transmitting section is 40%, and the length and the core and cladding refractive indices are the same as in the ninth embodiment.

The conduit image fiber 520 constructed as mentioned above, in which the cores 522a, 522b, and 522c adjacent one another are different in shape, like the ninth embodiment, is such that the production of cross talk is difficult and the core-to-core spacings, namely the diameter of the image fiber 520 itself can be reduced. Moreover, because the sectional areas of the cores 522a, 522b, and 522c are equal, the pixels are also equal in brightness, and there is no possibility of bringing unevenness to brightness in observing the object of even brightness.

Eleventh embodiment

Figure 21:
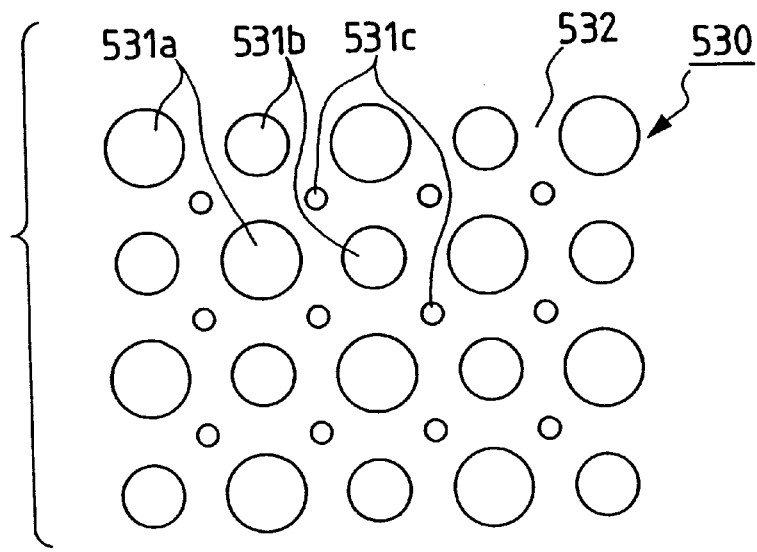
FIG. 21 is a partially sectional view showing the array of cores of a conduit image fiber in an eleventh embodiment of the present invention.

This embodiment, as shown in FIG. 21, is directed to a conduit image fiber 530 comprising alternate cores 531a each having a diameter of 3 μm and cores 531b each having a diameter of 2.5 μm which are regularly arranged at nearly 7-μm intervals in a square close-packed array, and cores 531c each having a diameter of about 1 μm which are interposed between respective two identical cores 531a and 531b which are diagonally arranged, so that all the cores 531a, 531b, and 531c are encased in a common cladding 532. In this image fiber, the core refractive index is 1.62, the cladding refractive index is 1.49, and the length is nearly 2 m.

In the conduit image fiber 530 of the eleventh embodiment constructed as in the foregoing, the diameters of the cores 531a, 531b, and 531c adjacent one another vary, and hence, as in the ninth embodiment, the propagation constants of the cores 531a, 531b, and 531c also vary, which makes the production of cross talk difficult. The result is that the core-to-core spacings, namely the outside diameter of the image fiber 530 itself can be reduced. Although the sectional areas of the cores 531a, 531b, and 531c are different, the cores 531a, 531b, and 531c are regularly arranged, and if the sum of areas of four pixels adjacent one another (one for each of the cores 531a and 531b and two for the cores 531c) is taken as one unit area, the ratio of the unit area to the sectional core area becomes uniform over the entire region of the transmitted image. Thus, there is not any fear of bringing unevenness to brightness in observing the object of even brightness.

Twelfth and thirteenth embodiments

Figure 22:
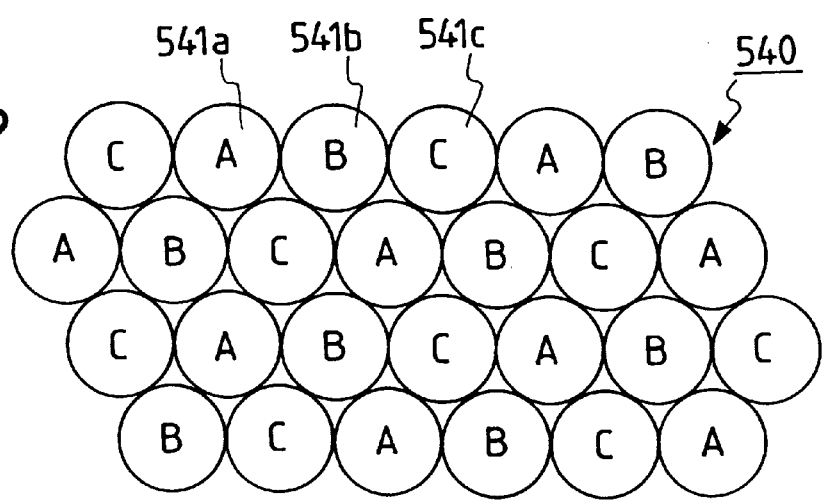
FIG. 22 is a partially sectional view showing the arrangement of optical fiber elements encased in a glass pipe for explaining the method of fabricating a conduit image fiber in a twelfth embodiment of the present invention.
Figure 23:
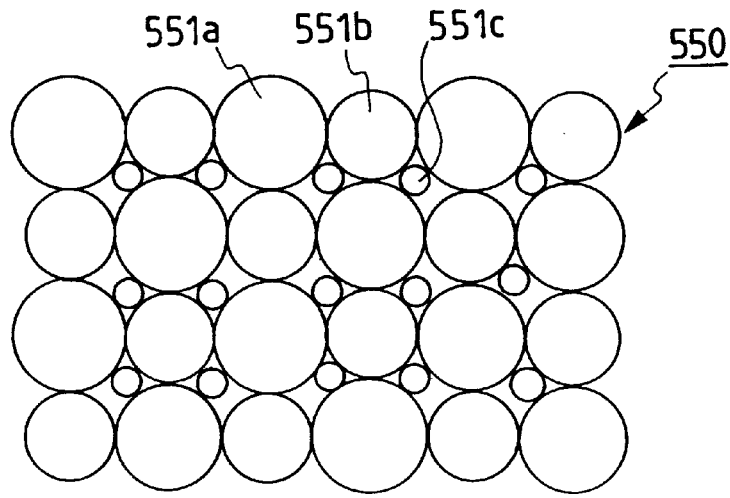
FIG. 23 is a partially sectional view showing the arrangement of optical fiber elements encased in a glass pipe for explaining the method of fabricating a conduit image fiber in a thirteenth embodiment of the present invention.

These embodiments, as shown in FIGS. 22 and 23, refer to the fabrication of conduit image fibers 540 and 550, respectively, which approximate to those of the ninth and tenth embodiments.

The twelfth embodiment uses three kinds of optical fiber elements 541a, 541b, and 541c whose outside diameters are 300, 306, and 312 μm, respectively, each having a core refractive index of 1.59, a cladding refractive index of 1.5177, and a core-to-cladding ratio of 2/3. The optical fiber elements 541a, 541b, and 541c are combined in order and are regularly arranged in a hexagonal close-packed array so that fiber elements having identical core diameters are prevented from being adjacent one another. Subsequently, the optical fiber elements 541a, 541b, and 541c, about 1000 for each kind, are inserted in a jacket pipe, are heated and compressed, together with the jacket pipe, and are elongated until the outside diameter reaches nearly 300 μm. In this way, a conduit image fiber 540 is fabricated.

In the thirteenth embodiment, three kinds of optical fiber elements 551a, 551b, and 551c having different diameters are likewise arranged in the jacket pipe, and are heated, compressed, and elongated to thereby obtain a conduit image fiber 550.

For the arrangements, the second technique may be used for the twelfth embodiment, and the first or second technique may also used for the thirteenth embodiment.

In each of the conduit image fibers 540 and 550 of the twelfth and thirteenth embodiments thus fabricated, the optical fiber elements 541a, 541b, and 541c, or 551a, 551b, and 551c, having different diameters are arranged so that fiber elements having identical core diameters are prevented from being adjacent one another. Hence, the production of cross talk is minimized, and because of their orderly array, observation is easily made and unevenness in brightness is eliminated, with the resultant image fiber of high resolving power.

Fourteenth embodiment

Figure 24:
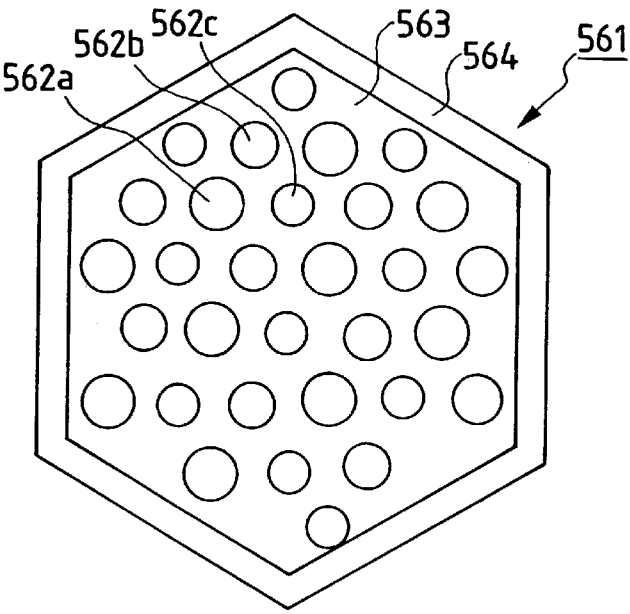
FIG. 24 is a partially sectional view showing the array of cores of a conduit image fiber unit in a fourteenth embodiment of the present invention.
Figure 25:
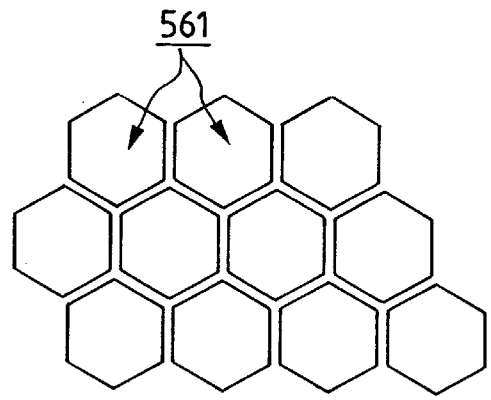
FIG. 25 is a partially sectional view showing the arrangement of conduit image fiber units encased in glass pipes for explaining the method of fabricating an Image fiber in the fourteenth embodiment.
Figure 26:
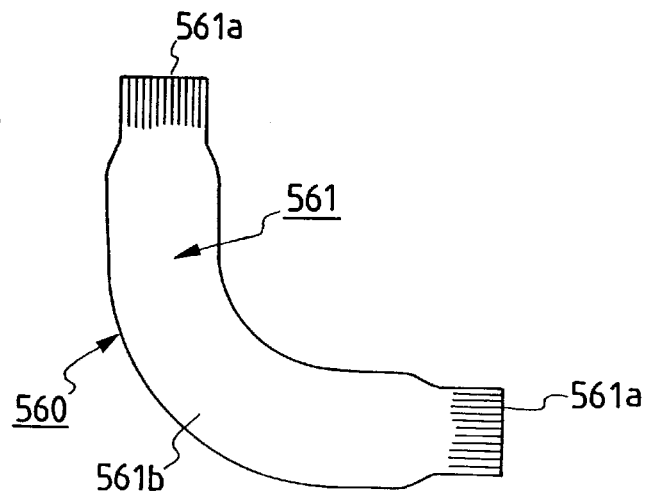
FIG. 26 is an explanatory view schematically showing the appearance of the image fiber fabricated in the fourteenth embodiment.

This embodiment, as shown in FIG. 24, similar to the ninth embodiment, employs three kinds of optical fiber elements 562a, 562b, and 562c having different core diameters. The optical fiber elements 562a, 562b, and 562c are encased in a common cladding 563 inside a jacket layer 564 consisting of an acid-soluble glass pipe of hexagonal cross section which has a refractive index of 1.57, and after being regularly arranged In a hexagonal close-packed array so that fiber elements having identical diameters are prevented from being adjacent one another, are heated, compressed, drawn, and elongated to obtain a conduit image fiber unit 561 with an outside diameter of about 200 μm. Subsequently, as shown in FIG. 25, the conduit image fiber units 561 which number nearly 500 are bundled, and are heated and compressed again. Then, in the resulting fiber bundle, the jacket layer 564, of each fiber unit 561, consisting of the acid-soluble glass pipe is dissolved, as shown In FIG. 26, in a middle portion 561b of the bundle excluding its entrance and exit ends, namely its ends 561a. In this way, an image fiber 560 is fabricated.

The image fiber 560 of the fourteenth embodiment constructed as mentioned above, although it has a relatively large outside diameter of about 5 mm, brings about the same function and effect as in the above embodiments and has sufficient flexibility and a high resolving power as many as a hundred thousand of pixels with a core-to-core spacing of 3.8 μm.

What is claimed is:

1. An image fiber comprising:
   at least three separate pluralities of cores having respective different sectional shapes and respective equal sectional areas; and
   a common cladding containing said separate pluralities of cores,
   wherein said separate pluralities of cores are arrayed so that any core included in one of said separate pluralities of cores is adjacent to a core included in a remaining one of said separate pluralities of cores, each core of at least 50% of said separate pluralities of cores is prevented from being adjacent to cores of a same plurality of cores among which said each core belongs, wherein said each core is a portion of said image fiber that transmits light.

2. An image fiber according to claim 1, wherein:

each core of at least 80% of said separate pluralities of cores is prevented from being adjacent to cores of the same separate plurality of cores among which said each core belongs.

3. An image fiber comprising:

at least three separate pluralities of cores having respective different diameters; and a common cladding containing said separate pluralities of cores, wherein said separate pluralities of cores are randomly arranged and arrayed so that any core included in one of said separate pluralities of cores is adjacent to a core included in a remaining one of said separate pluralities of cores, each core of at least 50% of said separate pluralities of cores is prevented from being adjacent to cores of a same plurality of cores among which said each core belongs, a maximum diameter of said at least three separate pluralities of cores surpassing a minimum diameter thereof by no more than 30%, and a number of pixels of said image fiber being no more than 5000.

4. An image fiber comprising:

at least three separate pluralities of cores having respective different diameters; and a common cladding containing said separate pluralities of cores, wherein said separate pluralities of cores are randomly arranged and arrayed so that any core included in one of said separate pluralities of cores is adjacent to a core included in a remaining one of said separate pluralities of cores, each core of at least 50% of said separate pluralities of cores is prevented from being adjacent to cores of a same plurality of cores among which said each core belongs, differences between respective diameters of cores of said at least three separate pluralities of cores being at least 0.5%; and a maximum diameter thereof surpassing a minimum diameter thereof by no more than 10%.

5. An image fiber comprising:

four to ten separate pluralities of cores having respective different diameters; and a common cladding containing said separate pluralities of cores, wherein said separate pluralities of cores are randomly arranged and arrayed so that any core included in one of said separate pluralities of cores is adjacent to a core included in a remaining one of said separate pluralities of cores, and each core of at least 50% of said separate pluralities of cores is prevented from being adjacent to cores of a same plurality of cores among which said each core belongs.

6. An image fiber according to claim 5, wherein:

said image fiber comprises four to six separate pluralities of cores having respective different diameters; and differences between said respective different diameters are 5 to 10%.

7. An image fiber comprising:

pluralities of cores; and a common cladding containing said pluralities of cores, wherein said pluralities of cores are randomly arranged and arrayed so that any core included in one of said pluralities of cores is adjacent to a core included in a remaining one of said pluralities of cores, each core of at least 50% of said separate pluralities of cores is prevented from being adjacent to cores of a same plurality of cores among which said each core belongs, a thickness t of said common cladding measured between the cores contained therein satisfying a condition:

$$1.8 \mu m > t > 0.8 \mu m.$$

8. An image fiber comprising:

four to ten separate pluralities of cores having respective different diameters; and a common cladding containing said separate pluralities of cores, wherein said separate pluralities of cores are randomly arranged and arrayed so that any core included in one of said separate plurality of cores is adjacent to a core included in a remaining one of said separate pluralities of cores, each core of at least 50% of said separate pluralities of cores is prevented from being adjacent to cores of a same plurality of cores among which said each core belongs, differences between respective diameters of said four to ten separate pluralities of cores being at least 2%, and a maximum diameter of said four to ten separate pluralities of cores surpassing a minimum diameter thereof by no more than 50%.

9. An image fiber according to claim 8, wherein:

said maximum diameter of said four to ten separate pluralities of cores surpasses the minimum diameter thereof by no more than 30%.

10. An image fiber comprising:

four to ten separate pluralities of cores having respective different diameters; and a common cladding containing said separate pluralities of cores, wherein said separate pluralities of cores are randomly arranged and arrayed so that any core included in one of said separate plurality of cores is adjacent to a core included in a remaining one of said separate pluralities of cores, each core of at least 50% of said separate pluralities of cores is prevented from being adjacent to cores of a same plurality of cores among which said each core belongs, differences between respective diameters of said four to ten separate pluralities of cores being at least 2%, a maximum diameter of said four to ten separate pluralities of cores surpassing a minimum diameter thereof by no more than 50%, and a thickness t of said common cladding measured between cores contained therein satisfying a condition:

$1.8 \mu m > t > 0.8 \mu m$.

11. An image fiber according to claim 10, wherein: a refractive index $n_1$ of a core included in said image fiber satisfies a condition:

$n_1 > 1.56$.

12. An image fiber according to claim 11, wherein said refractive index $n_1$ further satisfies a condition:

$1.7 > n_1$.

* * * * *